United States Patent
Geveci et al.

(10) Patent No.: US 9,328,674 B2
(45) Date of Patent: May 3, 2016

(54) CONTROLS FOR PERFORMANCE OPTIMIZATION OF INTERNAL COMBUSTION ENGINE SYSTEMS

(71) Applicant: Cummins Inc., Columbus, IN (US)

(72) Inventors: Mert Geveci, Diemar, NY (US); Feng Liu, Greenwood, IN (US); Andrew W. Osburn, Nashville, IN (US)

(73) Assignee: Cummins Inc., Columbus, IN (US)

( * ) Notice: Subject to any disclaimer, the term of this patent is extended or adjusted under 35 U.S.C. 154(b) by 42 days.

(21) Appl. No.: 14/175,258

(22) Filed: Feb. 7, 2014

(65) Prior Publication Data
US 2015/0226135 A1 Aug. 13, 2015

(51) Int. Cl.
| | |
|---|---|
| *F02D 29/02* | (2006.01) |
| *B60W 10/06* | (2006.01) |
| *B60W 20/00* | (2016.01) |
| *F02D 41/14* | (2006.01) |
| *F02D 41/24* | (2006.01) |
| *F02D 41/30* | (2006.01) |
| *F02D 41/00* | (2006.01) |

(52) U.S. Cl.
CPC ............... *F02D 29/02* (2013.01); *B60W 10/06* (2013.01); *B60W 20/00* (2013.01); *F02D 41/1463* (2013.01); *F02D 41/2438* (2013.01); *F02D 41/0047* (2013.01); *F02D 41/30* (2013.01); *F02D 2200/0625* (2013.01); *Y10S 903/902* (2013.01)

(58) Field of Classification Search
CPC .......... F02D 2200/0625; F02D 41/005; F02D 2200/0806; F02D 2200/0811; F01N 2900/0402
See application file for complete search history.

(56) References Cited

U.S. PATENT DOCUMENTS

| | | | |
|---|---|---|---|
| 3,758,764 A * | 9/1973 | Harner ........................ | 701/100 |
| 4,026,251 A | 5/1977 | Schweitzer et al. | |
| 6,487,849 B1 | 12/2002 | Bidner et al. | |
| 6,549,815 B1 * | 4/2003 | Kaji ............................... | 700/32 |
| 7,467,040 B2 | 12/2008 | Ker et al. | |
| 8,180,509 B2 * | 5/2012 | Grider et al. .................... | 701/22 |
| 8,813,690 B2 * | 8/2014 | Kumar et al. ................. | 123/1 A |
| 2007/0163244 A1 | 7/2007 | Federle | |
| 2007/0245714 A1 | 10/2007 | Frazier et al. | |
| 2008/0288091 A1 | 11/2008 | Yasui | |
| 2011/0264353 A1* | 10/2011 | Atkinson et al. .............. | 701/102 |
| 2012/0253637 A1* | 10/2012 | Jiang et al. .................... | 701/102 |
| 2013/0152549 A1* | 6/2013 | Light-Holets .................. | 60/274 |
| 2014/0260190 A1* | 9/2014 | DeGeorge ....................... | 60/274 |

OTHER PUBLICATIONS

Gafvert et al., "Control of GDI Engines Using Torque Feedback Exemplified by Simulations", Science Direct, Control Engineering Practice, Nov. 17, 2000, Elsevier Science Ltd., pp. 165-180.

Romero et al., "Optimization of SCR Control Technology for Reduced NOx Emissions, Improved Performance and Reduced Operating Expenses", New York State Energy Research and Development Authority, Apr. 2009, pp. 1-94.

* cited by examiner

*Primary Examiner* — Khoi Tran
*Assistant Examiner* — Ryan Rink
(74) *Attorney, Agent, or Firm* — Taft Stettinius & Hollister LP

(57) ABSTRACT

One illustrative embodiment is a method comprising operating an engine and an aftertreatment system by controlling a plurality of charge constituents provided the engine, iteratively perturbating one or more combustion inputs effective to vary operation of the engine, and determining fuel consumption and emissions information at the operating points effective to seek a weighted optimization of multiple parameters including fuel consumption and reductant consumption while also meeting a predetermined NOx emissions criterion. Further embodiments, forms, objects, features, advantages, aspects, and benefits shall become apparent from the description and figures.

24 Claims, 8 Drawing Sheets

CONTROLS FOR PERFORMANCE OPTIMIZATION OF INTERNAL COMBUSTION ENGINE SYSTEMS

BACKGROUND

With respect to internal combustion engine systems there remains an ever increasing need for techniques to improve fuel economy due to the cost of fuel as well as governmental regulations. At the same time, there is an increasing need for mitigation of ambient emissions of a number of pollutants including, for example, oxides of nitrogen (NOx), oxides of sulfur (SOx), particulate emissions, and hydrocarbon emissions. Internal combustion engines such as diesel engines may benefit from emissions control technologies such as oxidation catalysts, particulate filters, and selective catalytic reduction (SCR) systems to ameliorate emissions. Hybrid powertrain systems offer additional potential for reducing fuel consumption and mitigating emissions.

In pursuit of the aforementioned goals, powertrains may include increasingly complex and interdependent combinations of internal combustion engines and aftertreatment systems. The inclusion of hybrid powertrain components further increases complexity and adds interdependence. A further layer of complexity is that powertrain systems may have to meet different goals or requirements in different system applications and configurations. In many applications and configurations the system controls must cope with frequent and varying transient operating conditions, as well as longer term changes in duty cycle. For example, a commercial delivery vehicle may purposed for short haul operation in which it encounters transient states associated with city driving such as frequent acceleration and stopping along with steady state operation such as idling. This same vehicle may also be purposed for longer haul operation in which its duty cycle is nominally closer to consistent steady state (albeit a quite different type of steady state than idling) but is in fact subject to a variety of types of transients associated with changes in altitude, fuel quality variation, headwind, air temperature, grade changes, traffic flow, passing events, and/or engine braking events among others. Yet another layer of complexity is that the cost of fuel and urea solution as well as the regulation of fuel economy and emissions vary both over time and geographically.

The controls challenges for such systems are non-trivial. There is a need for control strategies and techniques which optimize multiple factors which contribute to the cost and expense of ownership and operation of such systems including, for example, consumption of fuel, consumption of reductant such as urea solution frequently utilized in SCR systems, and battery life and health, while simultaneously meeting potentially varying emissions requirements. Existing attempts to address these competing and varying goals and objectives suffer from a number of disadvantages, drawbacks, and shortcomings. Existing attempts also fail to account for manufacturing variation and aging effect of engines, aftertreatment systems, and hybrid powertrain components. There is a substantial and long-felt need for the controls techniques, apparatuses, methods and systems disclosed herein.

DISCLOSURE

For the purposes of clearly, concisely and exactly disclosing and describing exemplary embodiments of the invention, the manner and process of making and using the same, and to enable the practice, making and use of the same, reference will now be made to particular embodiments, including those illustrated in the figures, and specific language will be used to describe the same. It shall be understood that this description does not limit the scope of the invention, and that the invention includes and protects such alterations, modifications, variations and further applications of the exemplary embodiments as understood by one skilled in the art with the benefit of the following description.

SUMMARY

Unique controls for performance optimization of internal combustion engine systems are disclosed. Certain embodiments perform an iterative multivariate optimization effective to optimize a plurality of operating parameters including, for example, fuel consumption, reductant consumption, and/or battery characteristics. One illustrative embodiment is a method comprising operating an engine and an aftertreatment system by controlling a plurality of charge constituents provided the engine, iteratively perturbating one or more combustion inputs effective to vary operation of the engine, and determining fuel consumption and emissions information at the operating points effective to seek a weighted optimization of multiple parameters including fuel consumption and reductant consumption while also meeting a predetermined NOx emissions criterion. Further embodiments, forms, objects, features, advantages, aspects, and benefits shall become apparent from the following description and figures.

DETAILED DESCRIPTION OF ILLUSTRATIVE EMBODIMENTS

Figure 1:
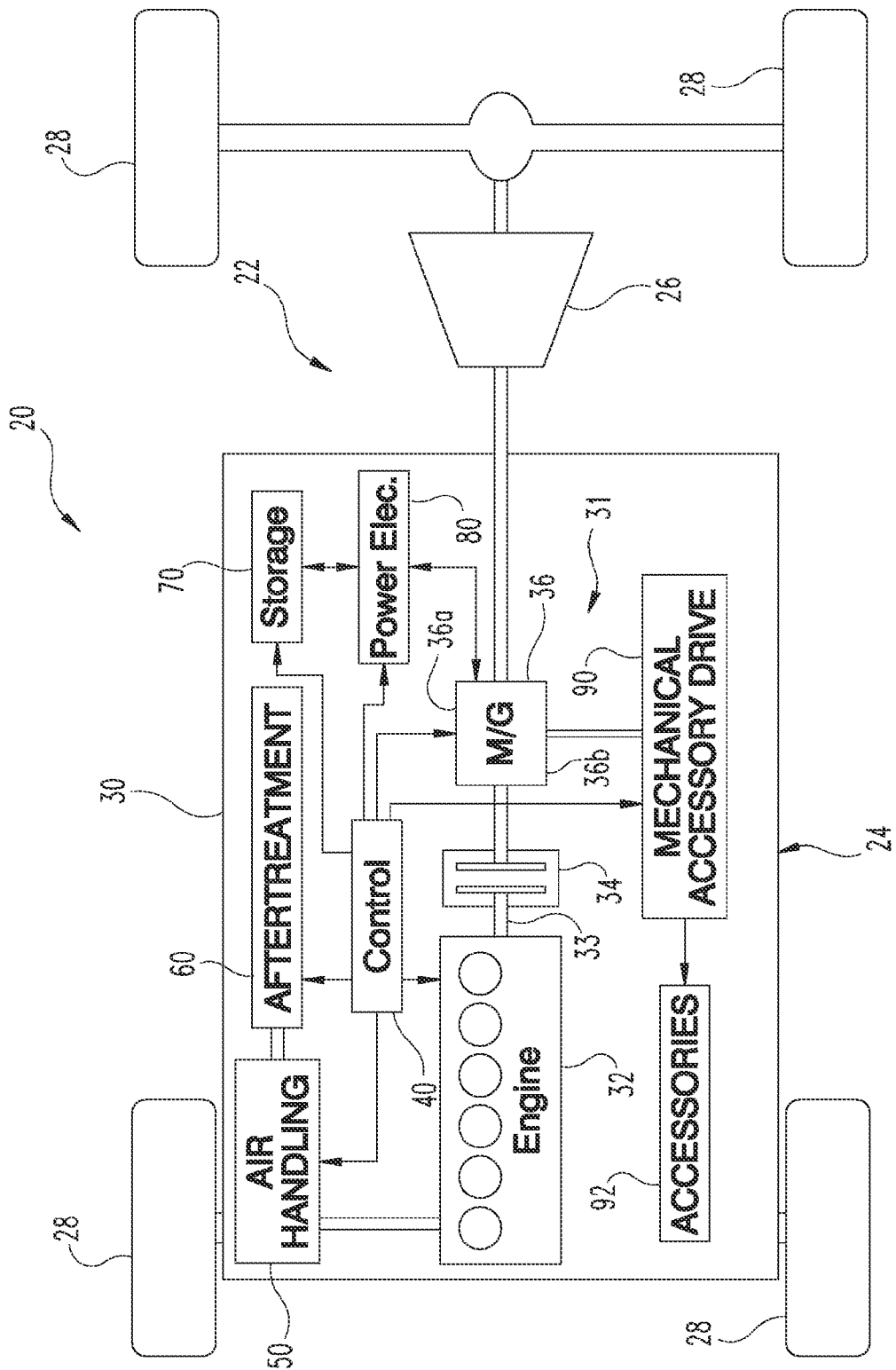
FIG. 1 is a partially diagrammatic view of a vehicle including a powertrain according to one illustrative embodiment.

With reference to FIG. 1 there is illustrated a partially diagrammatic view of a vehicle system 20 including a hybrid powertrain 22. It shall be appreciated that the configuration and components of vehicle system 20 are but one example, and that this disclosure contemplates that a variety of different hybrid vehicles and hybrid powertrain configurations and components as well as non-hybrid vehicles and non-hybrid powertrains, such as those comprising a diesel engine, may be utilized. Hybrid powertrain 22 includes a hybrid pretransmission hybrid system 24, a transmission 26, and ground engaging wheels 28. Depicted hybrid powertrain 22 system is a series-parallel hybrid (selectable with clutch 34), although the system may be, without limitation, a parallel configuration, a series configuration, and/or a series-parallel hybrid system.

It should be appreciated that in this embodiment, the propulsion of vehicle system 20 is provided by the rear wheels 28; however in other applications front wheel drive and four/all wheel drive approaches are contemplated. In one form vehicle system 20 is an on-road bus, delivery truck, service truck or the like; however in other forms vehicle system 20 may be of a different type, including other types of on-road or off-road vehicles. In still other embodiments it may be a marine vehicle (boat/ship) or other vehicle type. In yet other embodiments, rather than a vehicle, the hybrid power train 22, including the pretransmission hybrid power system 24 is applied to stationary applications, such as an engine-driven generator (a Genset), a hybrid system-driven pump, or the like to name just a few possibilities.

Pretransmission hybrid system 24 includes hybrid power system 30. System 30 includes internal combustion engine 32, clutch 34, motor/generator 36, controller 40, air handling subsystem 50, aftertreatment equipment 60, electrical power storage device 70, electrical power electronics device 80, and mechanical accessory drive subsystem 90. System 30 is in the form of a parallel hybrid power source 31 such that engine 32 and/or motor/generator 36 can provide torque for power train 22 depending on whether clutch 34 is engaged or not. It should be appreciated that motor/generator 36 can operate as a motor 36*a* powered by electricity from storage device 70, or as an electric power generator 36*b* that captures electric energy. In other operating conditions, the motor/generator may be passive such that it is not operating at all. In the depicted form, motor/generator 36 has a common rotor 37*a* and a common stator 37*b*, and is provided as an integrated unit; however in other embodiments a completely or partially separate motor, generator, rotor, stator, or the like may be employed. The designated motor/generator 36 is intended to encompass such variations. Furthermore it should be appreciated that in alternative embodiments of system 30 some of these features, such as air handling subsystem 50, aftertreatment equipment 60, and/or mechanical accessory drive 90 may be absent and/or other optional devices/subsystems may be included (not shown).

In certain embodiments the motor/generator 36 may comprise a hydraulic or pneumatic pump rather than an electric motor/generator. It shall be appreciated that references to a motor/generator herein are intended to encompass both electric motor/generators and non-electric motor/generators such as those comprising hydraulic or pneumatic pumps. Furthermore, power storage device 70 of system 30 may comprise one or more electrochemical batteries, supercapacitors or ultracapacitors, or may alternatively store energy in a different, non-electrical medium such as an accumulator found in a hydraulic or pneumatic hybrid system. It shall be appreciated that references to a battery herein are intended to encompass electrochemical storage batteries, other electrical storage devices such as capacitors, and non-electrical energy storage devices such as accumulators utilized in hydraulic or pneumatic hybrid systems.

In the illustrated embodiment, engine 32 is of a four-stroke, diesel-fueled, Compression Ignition (CI) type with multiple cylinders and corresponding reciprocating pistons coupled to crankshaft 33, which typically would be coupled to a flywheel. Crankshaft 33 is mechanically coupled to controllable clutch 34. Engine 32 may be of a conventional type with operation modifications to complement operation in system 30. In other embodiments, engine 32 may be of a different type, including different fueling, different operating cycle(s), different ignition, or the like.

Vehicle system 20 further includes a controller 40 which may be configured to control various operational aspects of vehicle system 20 and hybrid powertrain 22 as described in further detail herein. Controller 40 may be implemented in any of a number of ways. Controller 40 executes operating logic that defines various control, management, and/or regulation functions. This operating logic may be in the form of one or more microcontroller or microprocessor routines stored in a non-transitory memory, dedicated hardware, such as a hardwired state machine, analog calculating machine, various types of programming instructions, and/or a different form as would occur to those skilled in the art.

Controller 40 may be provided as a single component, or a collection of operatively coupled components; and may comprise digital circuitry, analog circuitry, or a combination of both of these types. When of a multi-component form, controller 40 may have one or more components remotely located relative to the others in a distributed arrangement. Controller 40 can include multiple processing units arranged to operate independently, in a pipeline processing arrangement, in a parallel processing arrangement, or the like. In one embodiment, controller 40 includes several programmable microprocessing units of a solid-state, integrated circuit type that are distributed throughout system 30 that each include one or more processing units and non-transitory memory. For the depicted embodiment, controller 40 includes a computer network interface to facilitate communications using standard Controller Area Network (CAN) communications or the like among various system control units. It should be appreciated that the depicted modules or other organizational units of controller 40 refer to certain operating logic performing indicated operations that may each be implemented in a physically separate controller of controller 40 and/or may be virtually implemented in the same controller.

The description herein including modules and/or organizational units emphasizes the structural independence of the aspects of the controller, and illustrates one grouping of operations and responsibilities of the controller. Other groupings that execute similar overall operations are understood within the scope of the present application. Modules and/or organizational units may be implemented in hardware and/or as computer instructions on a non-transient computer readable storage medium, and may be distributed across various hardware or computer based components.

Examples and non-limiting implementation elements of modules and/or organizational units of the controller 40 include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Controller 40 and/or any of its constituent processors/controllers may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or functional components as would occur to those skilled in the art to perform the desired communications.

Controller 40 may be configured to control operation of vehicle system 20 in a variety of manners. In one particular aspect, controller 40 is configured to seek an optimization of the operation of vehicle system 20 by controlling one or more control inputs to achieve a multivariate optimization. A variety of parameters may be controlled in connection with a multivariate optimization. In certain embodiments, the controlled parameters comprise inputs to the combustion process, for example, one or more of EGR fraction, mass charge flow, fueling quantity, injection timing, intake valve timing, exhaust valve timing, rail pressure, and intake manifold temperature which may be controlled or influenced by turbocharger operation, ambient conditions as well as by a charge air cooler bypass or EGR cooler bypass operation, and rail pressure among others. In certain embodiments the controlled parameters additionally or alternately comprise one or more aftertreatment system controls, for example, ammonia-to-NOx ratio (ANR), temperature, ammonia storage targets, regeneration frequency or schedule for a particulate filter or other aftertreatment component, hydrocarbon post injection and/or external hydrocarbon dosing to control temperature of a catalytic component, and dosing quantity or rate of urea solution or other reductant(s) among others. In certain embodiments the controlled parameters additionally or alternately comprise one or more hybrid control parameters, for example, one or more of positive or negative output of a motor/generator, power electronics controls inputs, and battery controls inputs such as those relating to state of health and state of charge among others. It shall be appreciated the controlled parameters for hybrid system components may include electrical characteristics such as battery state of charge targets as well as targets for various other system charges, currents, voltages, powers, capacitances, inductances, phases and frequencies among other parameters, as well as mechanical characteristics such as torque, speed, power, and temperature among others, and combinations thereof.

A number of different multivariate optimization goals may also be pursued. Certain embodiments seek a weighted optimization of fuel consumption and urea consumption while concurrently meeting emissions criteria. Certain embodiments additionally or alternately include battery life and/or battery health as an optimization criterion. Certain embodiments additionally or alternately include combined optimization of fuel consumption and catalyst degradation. Certain embodiments additionally or alternately minimize fuel consumption versus emissions criteria other than strict limits, for example, where a manufacturer elects to trade emissions credits among different products to achieve overall compliance in an environmentally sound and economic way.

The optimization performed by the controller 40 may be based upon a variety of information that is measured or sensed (physically or virtually), estimated or approximated. In certain embodiments system operating conditions such as engine speed, load, fuel consumption, tailpipe emission such as NOx concentration, catalyst ammonia storage level, soot loading, and/or various system temperatures and flow rates are utilized as inputs to an optimization routine such as an extremum seeking control routine provided in controller 40. In certain embodiments hybrid system operating conditions such as electrical and/or mechanical outputs or states are utilized as inputs to an optimization routine such as an extremum seeking control routine provided in controller 40.

It should be appreciated that the illustrative controls techniques disclosed herein are uniquely and unexpectedly robust and adaptive. They may be implemented across a broad range of internal combustion engine systems and applications. They may be implemented in embodiments which provide a long-term adaptive optimization capability based on actual operational data or estimates thereof effective to significant sources of optimization error including manufacturing variability, variation in operating or duty cycles for different applications and implementations of similar or substantially similar systems, variation in operator or user input, changes in system operation and capability due to aging or external influences on a system among others. These unexpected advantages may be realized in a variety of embodiments several preferred examples of which shall now be further described. It should further be appreciated that transient operation modes introduce a high degree of difficulty and unpredictability into the controls problems particularly when coupled with the fact that operation must occur over a broad range of the system operating map.

Figure 2:
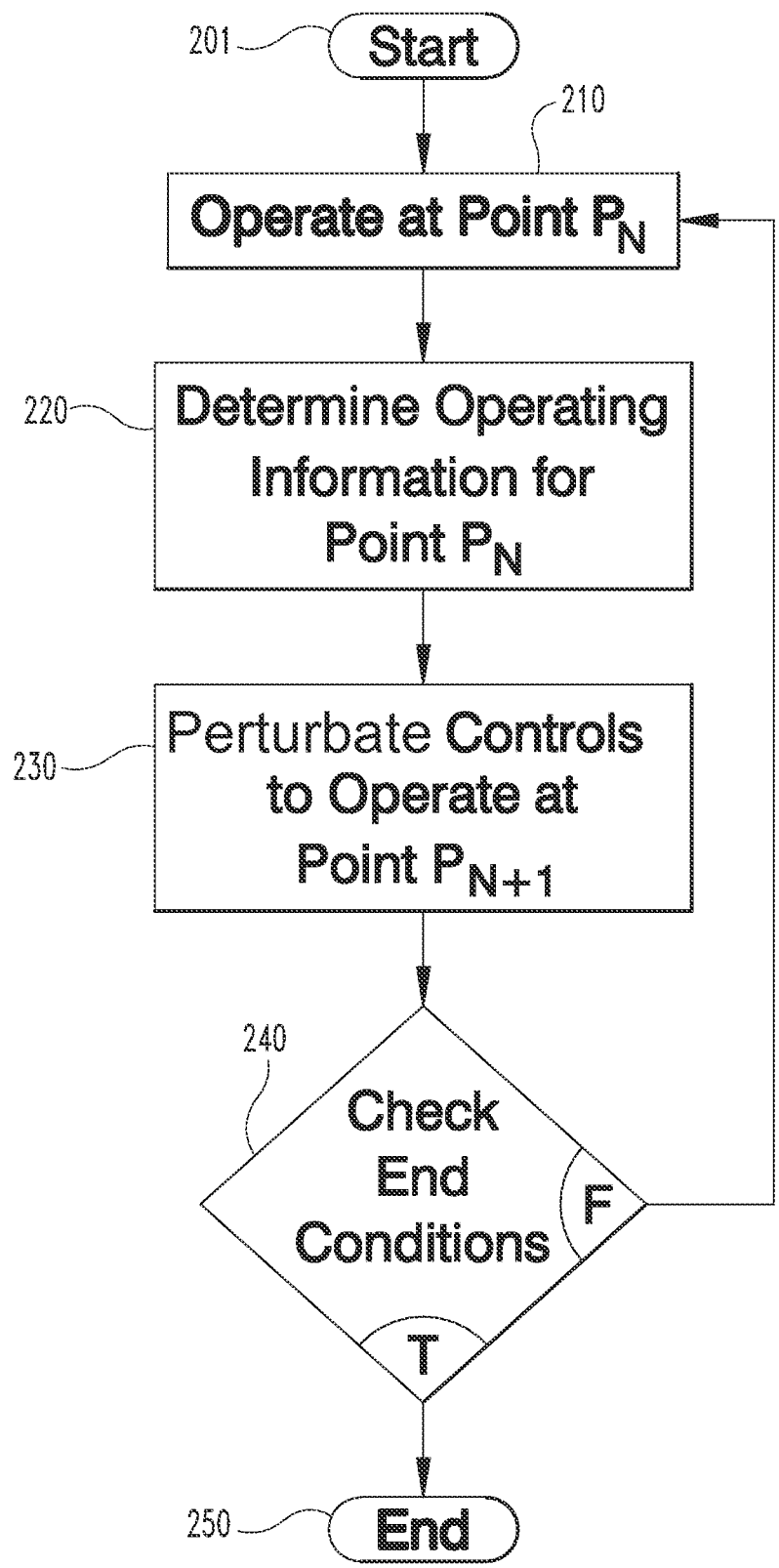
FIG. 2 is a flow diagram of a controls process according to one illustrative embodiment.

With reference to FIG. 2 there is illustrated a flow diagram of a controls process 200 according to one illustrative embodiment. Process 200 is initiated at operation 201 and proceeds to operation 210. Operation 210 operates a system including an internal combustion engine and an aftertreatment system at a first operating point $P_N$. The system may be the same as or similar to system 20 described in connection with FIG. 1 as well as different types and variations of internal combustion engine systems including those variations described above. In an initial iteration of process 200, the operating point $P_N$ may be selected without a prior knowledge of its position on an operating map or a priori information about the contours or values of the map. In other words, the values of the parameters being optimized and the changes in those values that would result from changing the operating point on the operating map need not be known in advance. The operating controls may be selected based upon initial assumptions or non-optimized controls criteria.

From operation 210 process 200 proceeds to operation 220 which determines system operating information for an operating point $P_N$. In certain embodiments operation 220 determines fuel consumption information and tailpipe emissions information for operating point $P_N$. In other embodiments a variety of additional or alternate operating information may be determined including, for example, those described above in connection with FIG. 1 and controller 40. In certain embodiments the operating map is described by a multidimensional space including information pertaining to consumption of fuel, emissions, and/or consumption of urea. In other embodiments a variety of additional or alternate multi-dimensional operating maps may be utilized including, for example, those describing battery health, battery operating conditions, and/or temperature(s) of system components among other information. It shall be appreciated that any parameter relating to the operation of the system being controlled and of interest for the purposes of control or optimization may be included in the space described by the operating map.

From operation 220 process 200 proceeds to operation 230 which perturbates the system controls to change operating point $P_N$ to a new operating point $P_{N+1}$. A number of different perturbation techniques may be utilized, for example, the perturbation may be based upon information relating to operating points from prior iterations, for example, magnitude information, slope information, vector information, rate of change information, aggregation information, and/or summation information among other types of information. In certain embodiments an extremum seeking control technique is utilized to seek point on an operating map while the system under control is operating at steady-state operating conditions. Process 230 then adaptively adjusts the controlled variables to drive system performance output to extremum values with predetermined bounds on the controlled variables. In certain embodiments sinusoidal perturbation can be applied to achieve fast adaptation. This technique may be advantageous if the system map is a dynamic process. In certain embodiments where the mapping of the process is static, numerical based algorithms may be preferred, such as the simultaneous perturbation stochastic approximation (SPSA), persistently exciting finite differences (PEFD) and the steepest descent algorithms such as the Box and Wilson steepest descent algorithm (BWSD).

From operation 230 process 200 proceeds to conditional 240 which checks whether an end condition is present. If an end condition is true, process 200 proceeds to operation 250 which ends process 350. If an end condition is not present operation 250 returns to operation 210 and process 200 continues as described above. It shall be appreciated that in subsequent iterations each new point $P_{N+1}$ is later treated by process 200 as the current point $P_N$ for repeated executions of operation 220 and that the system does not necessarily return to the original point $P_N$ is the result of the perturbation process. It shall be further appreciated that process 200 is but one example of a control loop which may be utilized to implement the controls disclosed herein. The order of operations may vary in other embodiments, and additional or alternate operations may be utilized.

Figure 3:
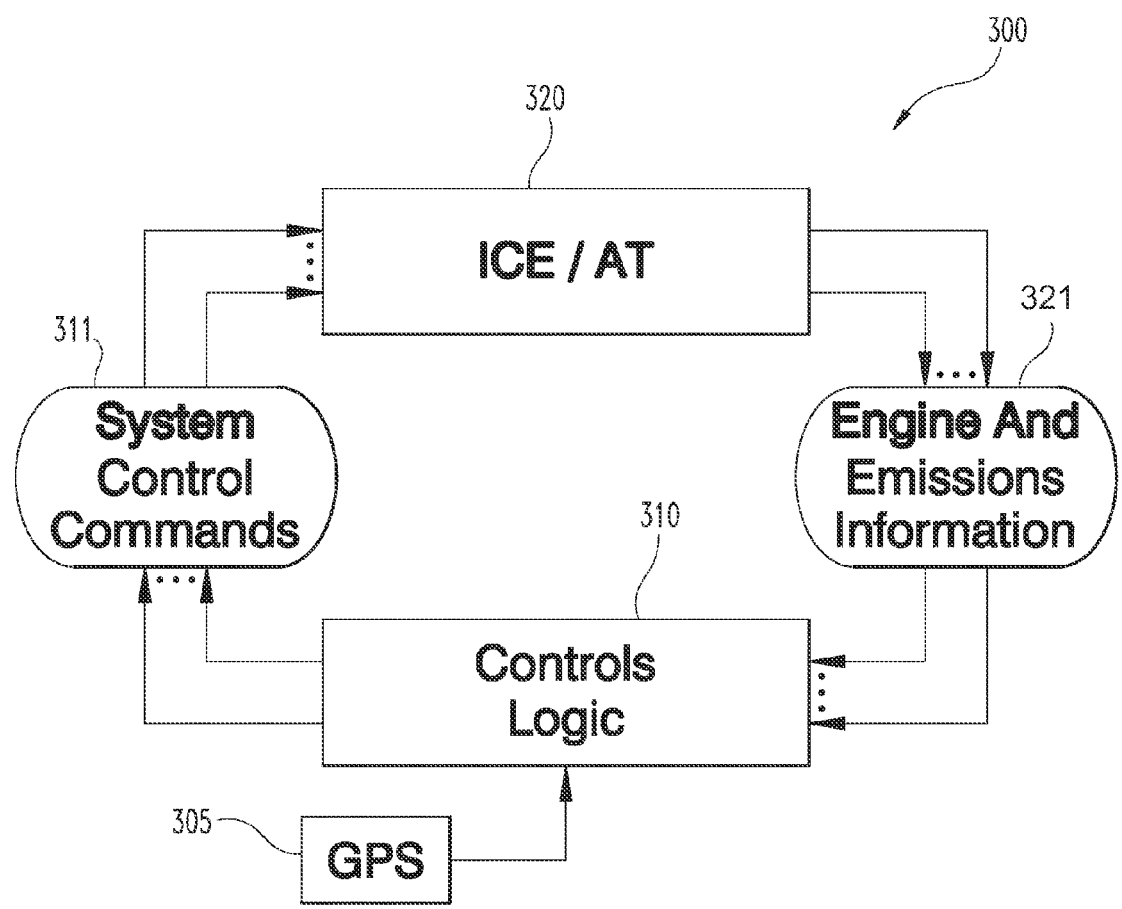
FIG. 3 is a schematic diagram of a control system according to one illustrative embodiment.

With reference to FIG. 3 there is illustrated a schematic diagram of a control system 300 according to one illustrative embodiment. Control system 300 includes controls module 310 which may be implemented in one or more control modules, for example, in controller 40 or any of the variations described above in connection with FIG. 1. Control module 310 outputs system control commands 311 to internal combustion engine and aftertreatment system 320. It is contemplated that a variety of system control commands may be utilized. For example, system control commands 311 may include combustion control commands, such as EGR fraction, mass charge flow, fueling quantity, injection timing, and/or rail pressure. System control command 311 may also include aftertreatment control commands, for example, an ammonia to NOx ratio, a urea injection or dosing quantity, or other commands effective to control the operation of an aftertreatment system.

Internal combustion engine and aftertreatment system 320 operates at least in part based upon the system control commands 311 which it receives from control module 310. Engine and emissions information 321 regarding internal combustion engine and aftertreatment system 320 is provided to control module 310. It is contemplated that engine and emissions information 321 may be sensed using a physical or virtual sensor, or estimated or approximated. Engine and emissions information 321 may include a variety of information, for example, tailpipe NOx emissions, and specific fuel consumption. Control logic receives engine and emissions information 321 and perturbates a subsequent system control commands 311 based at least in part upon engine and emissions information 321, for example, using one or more of the techniques described above in connection with FIG. 2.

Controls logic 310 may also receive information regarding the geographical position of internal combustion engine and aftertreatment system 320 from GPS input 305. Controls logic 310 may alter the type of perturbation utilized to set new system control commands, or alter the optimization targets. For example, controls logic 310 may set a percent weight for specific fuel consumption and a percent weight for tailpipe NOx emissions based upon GPS input 305. In this manner controls logic 310 is able to account for variations in local emissions requirements which may be encountered for example as a vehicle or other engine system travels or has moved between the territory of different regulatory authorities. In certain embodiments controls logic 310 may utilize a table which associates GPS data with predetermined or dynamically determined emissions criteria associated with different governmental regulations corresponding to the GPS data.

In certain embodiments controls logic 310 may utilize a table which further associates GPS data with predetermined or dynamically determined fuel cost and/or reductant cost information corresponding to the GPS data. Such predetermined data may be programmed into controls logic at the time of manufacture and/or during service events. Dynamically determined data may be updated periodically or in real time utilizing any of a variety of wireless communication techniques including, for example, cellular data communication, or satellite data communication among others. It shall be appreciated that the optimizations associated with controls logic 310 may perform a multivariate optimization that accounts for actual or estimated fuel consumption, fuel cost as a function of geographical position, actual or estimated reductant consumption, reductant cost as a function of geographical position, and emissions requirements as a function of geographical position while meeting emissions criteria which may also vary as a function of geographical position. It shall further be appreciated that additional parameters relating to geographic position may be accounted for by the optimization including, for example, altitude, fuel quality such as cetane number, and real time fuel cost.

Figure 4:
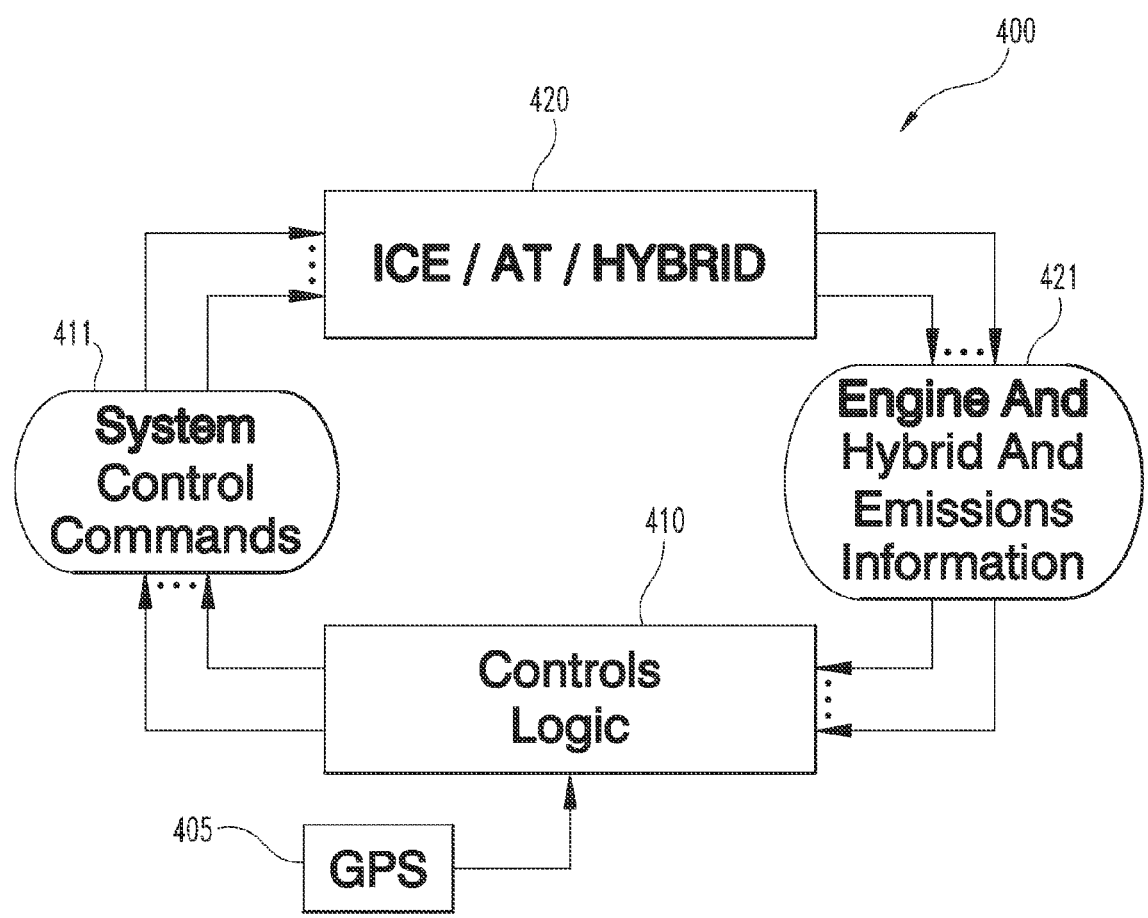
FIG. 4 is a schematic diagram of a control system according to a further illustrative embodiment.

With reference to FIG. 4 there is illustrated a schematic diagram of a control system 400 according to another illustrative embodiment. Control system 400 includes controls module 410 which may be implemented in one or more control modules, for example, in controller 40 or any of the variations described above in connection with FIG. 1. Control module 410 outputs system control commands 411 to internal combustion engine, aftertreatment and hybrid powertrain system 420. It is contemplated that a variety of system control commands may be utilized. For example, system control commands 411 may include combustion control commands, such as EGR fraction, mass charge flow, fueling quantity, injection timing, and/or rail pressure. System control command 411 may also include aftertreatment control commands, for example, an ammonia to NOx ratio, a urea injection or dosing quantity, or other commands effective to control the operation of an aftertreatment system.

System 420 operates at least in part based upon the system control commands 411 which it receives from control module 410. Information 421 relating to the operation of system 420 is provided to control module 410. Information 421 may be sensed using a physical or virtual sensor, or estimated or approximated. Information 421 may include a variety of information, for example, tailpipe emissions such as NOx emissions, and fuel consumption indicia such as specific fuel consumption, information pertaining to battery health, battery operating conditions, and/or temperature(s) of hybrid powertrain components of other system components as well as other information. Control logic receives information 421 and perturbates a subsequent system control commands 411 based at least in part upon Information 421, for example, using one or more of the techniques described above in connection with FIG. 2.

Controls logic 410 may also receive information regarding the geographical position of internal combustion engine and aftertreatment system 420 from GPS input 405. Controls logic 410 may alter the type of perturbation utilized to set new system control commands, or alter the optimization targets. For example, controls logic 410 may set a percent weight for specific fuel consumption and a percent weight for tailpipe NOx emissions based upon GPS input 405. In this manner controls logic 410 is able to account for variations in local emissions requirements which may be encountered for example as a vehicle or other engine system travels or has moved between the territory of different regulatory authorities.

Figure 5:
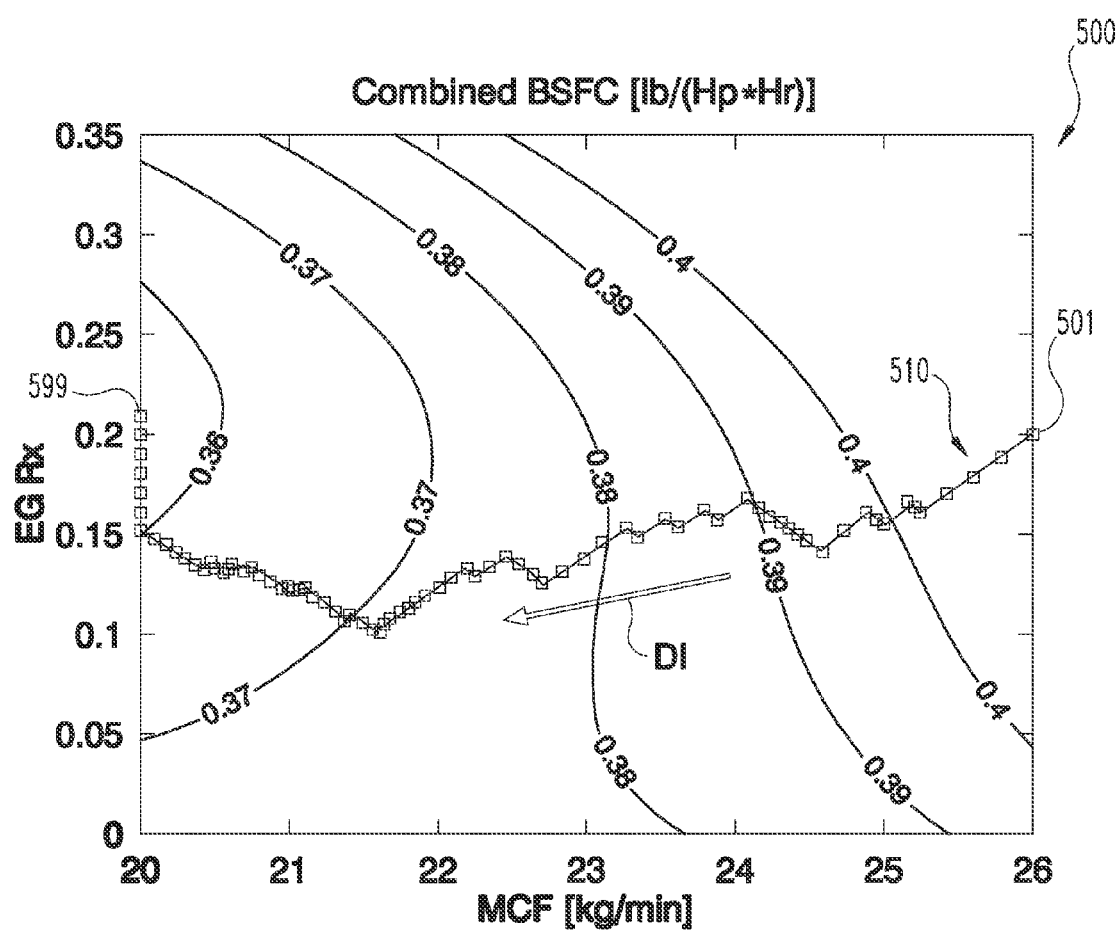
FIGS. 5 and 6 are graphs depicting a multivariate optimization operation according to one illustrative embodiment.
Figure 6:
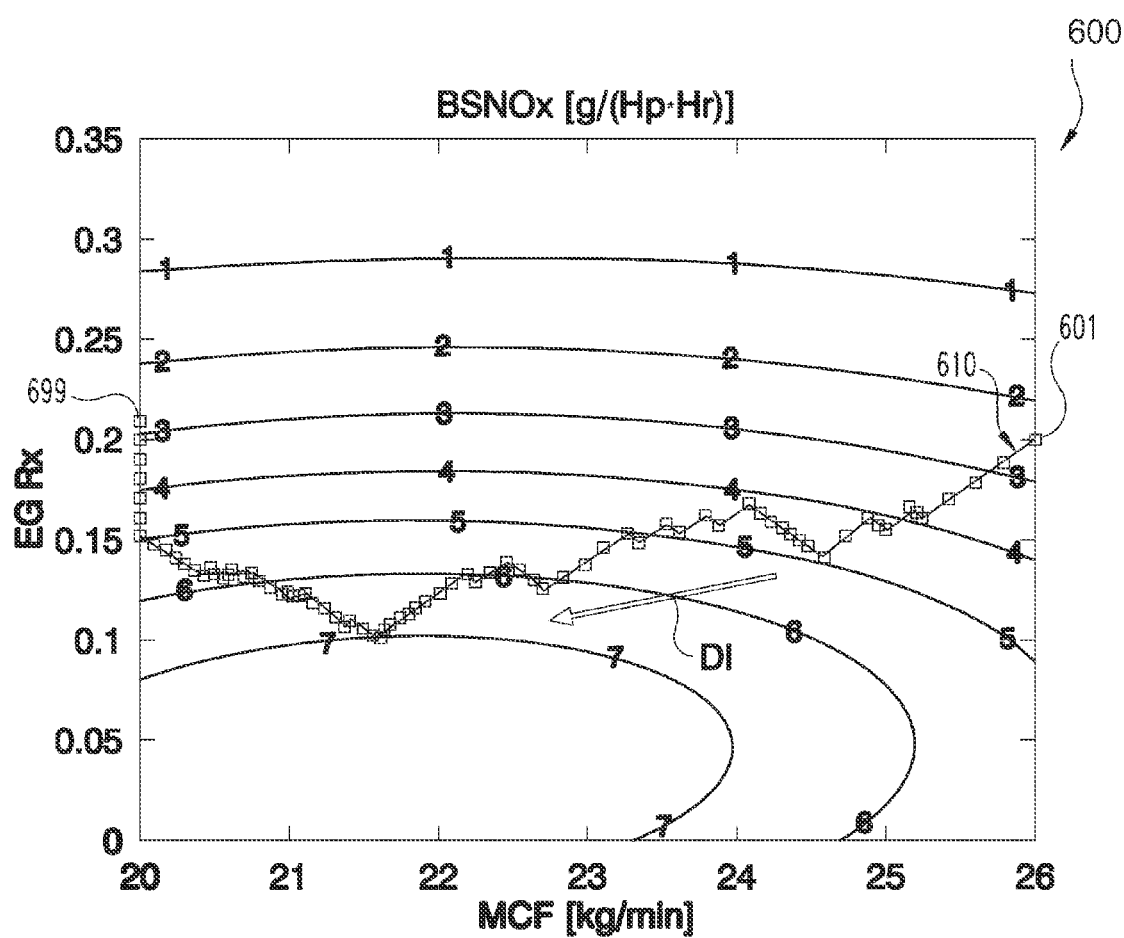

With reference to FIGS. 5 and 6 there are illustrated graphs 500 and 600 depicting an optimization operation according to one embodiment. The illustrated optimization seeks to minimize combined diesel and DEF consumption at steady-state (e.g. a B50 operating state or another medium speed, medium load operating state) using constrained EGR fraction and Mass charge flow. The underlying aftertreatment system for graphs 500 and 600 has a >98% deNOx conversion efficiency. FIG. 5 illustrates contour lines indicating brake specific fuel consumption (bsFC) as a function of EGR fraction and mass charge flow. FIG. 6 illustrates contour lines indicating brake specific NOx emissions (bsNOx) as a function of EGR fraction and mass charge flow.

The optimization is performed in the combined multidimensional space described by both graphs 500 and 600 which are illustrated separately for comprehensibility and convenience of illustration. The optimization begins at points 501, 601 and proceeds iteratively along extremum seeking path 510, 610 in the direction generally indicated by arrow DI until optimized operating points 599, 699 are achieved. The brake specific NOx emissions (bsNOx) may be as high as 7 g/(HpHr). An optimum engine operating condition of ~20 kg/min mass charge flow and 21% EGR is achieved in the illustrated example.

Figure 7:
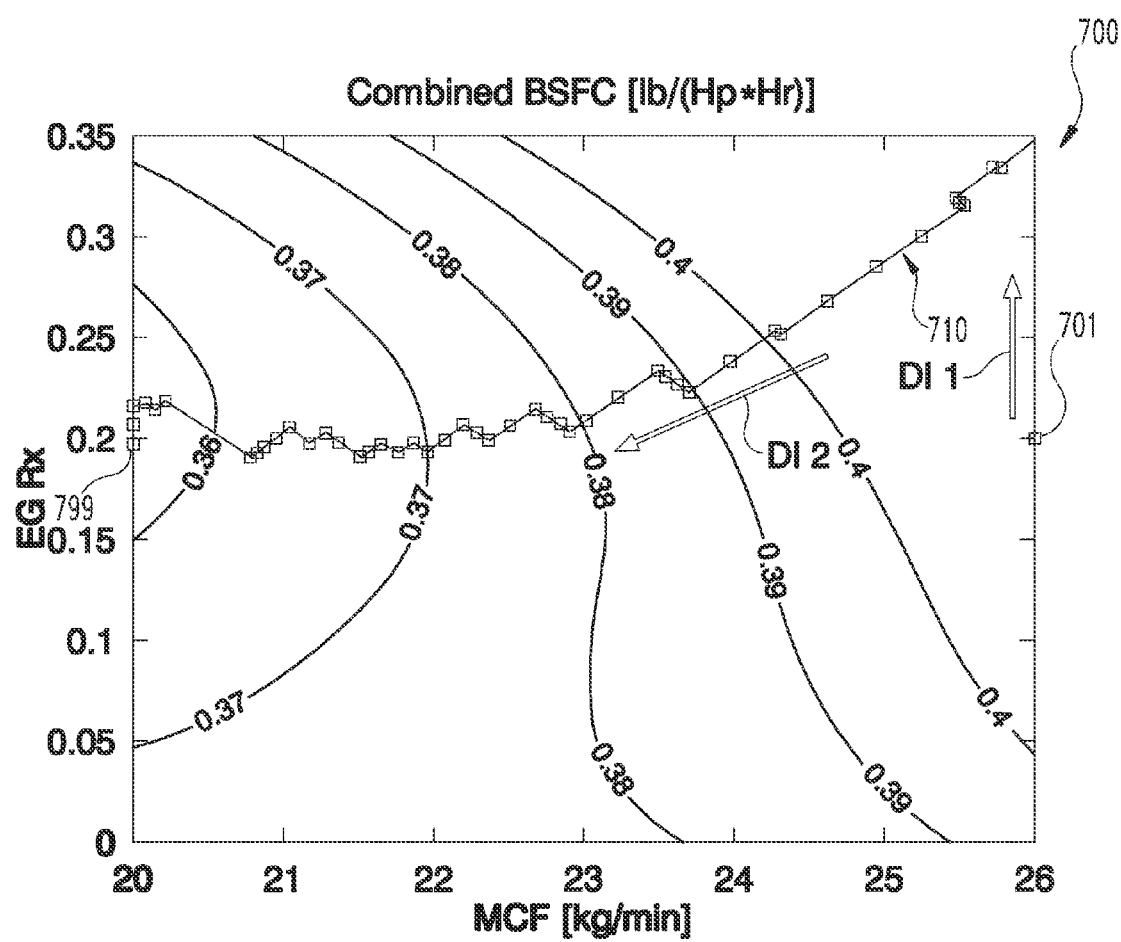
FIGS. 7 and 8 are graphs depicting a multivariate optimization operation according to a further illustrative embodiment.
Figure 8:
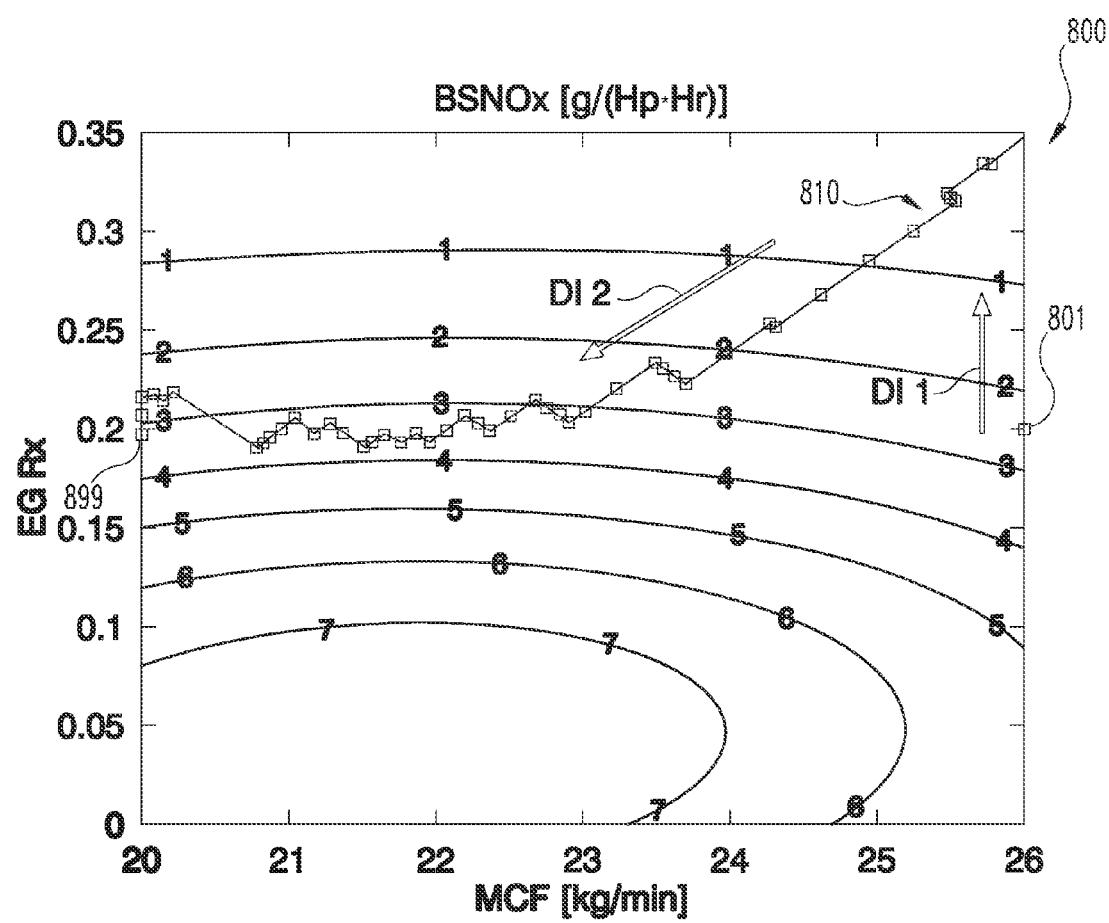

With reference to FIGS. 7 and 8 there are illustrated graphs 700 and 800 depicting an optimization operation according to another embodiment. The illustrated optimization seeks to minimize combined diesel and DEF consumption at steady-state (e.g. a B50 operating state) using constrained EGR fraction and Mass charge flow. The underlying aftertreatment system for graphs 700 and 800 has a >95% deNOx conversion efficiency. FIG. 7 illustrates contour lines indicating brake specific fuel consumption (bsFC) as a function of EGR fraction and mass charge flow. FIG. 8 illustrates contour lines indicating brake specific NOx emissions (bsNOx) as a function of EGR fraction and mass charge flow.

The optimization is performed in the combined multidimensional space described by both graphs 700 and 800 which are illustrated separately for comprehensibility and convenience of illustration. The optimization begins at points 701, 801 and proceeds iteratively along extremum seeking path 710, 810 in the direction generally indicated by arrow DI until optimized operating points 799, 899 are achieved. The maximum bsNOx is 3.5 g/(HpHr). An optimum engine operating condition of ~20 kg/min mass charge flow and 21% EGR is achieved in the illustrated example.

With respect to the examples of both FIGS. 5 and 6 and FIGS. 7 and 8, it shall be appreciated that the bounds on the combustion recipe (e.g., controlled variables such as EGR fraction and mass charge flow) can be predetermined based upon performance calibration, but the exact value can be achieved by the extremum seeking control. This approach can therefore take advantage of the experience of calibration engineers and provide an optimal or near optimal solution, at the same time, this approach will also reduce the calibration effort, since a relatively rough and imprecise calibration can be enabled. For example, variance from fuel efficiency targets up to about 5%, up to about 10% or less, or up to about 20% may be accommodated. It shall be understood that such variance qualifies as about a particular percentage if it is either within an acceptable error range which shall be understood to be driven by the particulars of the optimization and optimized parameters or where the variance does not result in appreciable changes in real operation, e.g., where the combined rough calibration and controls optimization described here yields a result with acceptable error. More qualitatively, the controls disclosed herein enable the operating assumptions utilized to define calibration factors to be reduced making the calibration more robust in the sense that it is not artificially confined by assumptions about how the system will operate.

It shall be understood that the exemplary embodiments summarized and described in detail and illustrated in the figures are illustrative and not limiting or restrictive. Only the presently preferred embodiments have been shown and described and all changes and modifications that come within the scope of the invention are to be protected. It shall be appreciated that the embodiments and forms described above may be combined in certain instances and may be exclusive of one another in other instances. Likewise, it shall be appreciated that the embodiments and forms described above may or may not be combined with other aspects and features. It should be understood that various features and aspects of the embodiments described above may not be necessary and embodiments lacking the same are also protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:

operating a vehicle system including an internal combustion engine, an selective catalytic reduction aftertreatment system, and a control system configured to control a plurality of constituents provided to the engine for combustion and configured to control operation of the selective catalytic reduction aftertreatment system;

operating the control system to control the plurality of constituents at a non-optimized operating point in a parameter space describing fuel consumption and NOx emissions of the vehicle system based on the plurality of controlled constituents;

perturbating at least one of the controlled constituents effective to change the operating point in the parameter space;

determining fuel consumption information and NOx emissions information at the changed operating point; and repeating the acts of perturbating and determining a plurality of times to operate at a plurality of changed operating points based at least in part upon a predetermined perturbation criterion and the determined information at one or more changed operating points;

wherein the method is effective to iteratively approach a multivariate optimization target including a fuel consumption component and reductant consumption component while meeting a predetermined NOx emissions criterion, and wherein the iterative approaching of the multivariate optimization target occurs independently from any a priori knowledge of initial values of the parameter space.

2. The method of claim 1 wherein the non-optimized operating point is calibrated to meet the predetermined NOx emissions criterion but not to minimize consumption of fuel or reductant.

3. The method of claim 1 wherein the plurality of controlled constituents comprise at least one of exhaust gas recirculation fraction, mass charge flow, fueling quantity, injection timing and rail pressure.

4. The method of claim 1 wherein the predetermined perturbation criterion comprises an exciting finite differences technique.

5. The method of claim 1 wherein the multivariate optimization target varies as a function of time and regulatory emissions requirements for a geographical location.

6. The method of claim 1 wherein the multivariate optimization target varies as a function of time, fuel cost information of a geographical location of the vehicle system, reductant cost information of the geographical location, and regulatory emissions requirements of the geographical location.

7. The method of claim 1 wherein the parameter space describing fuel consumption and NOx emissions of the vehicle system as a function of the plurality of controlled constituents comprises a dynamically determined multidimensional operating map stored in a nontransitory computer readable medium.

8. A system comprising:
an internal combustion engine;
an selective catalytic reduction aftertreatment system; and
a controller configured to control operation of the engine by varying at least two combustion inputs to the engine and configured to control operation of the selective catalytic reduction system;
wherein the controller is configured to seek a weighted optimization of multiple variables including fuel consumption and reductant consumption while meeting a predetermined NOx emissions criterion by:
iteratively varying at least one of the combustion inputs effective to vary an operating point on an engine operating map describing fuel consumption and NOx emissions of the system based on the at least two combustion inputs to the engine,
determining fuel consumption and NOx emissions at each iterated operating point on the engine operating map, and
selecting each subsequent iterative operating point based at least in part upon the determined fuel consumption and NOx emissions of a current operating point, and
wherein iteratively varying at the least one of the combustion inputs effective to vary an operating point on an engine operating map describing fuel consumption and NOx emissions of the system in response to the at least two combustion inputs to the engine occurs independently from any a priori knowledge of initial values of the at least two combustion inputs.

9. The system of claim 8 wherein one of the at least two combustion inputs comprise mass charge flow and exhaust gas recirculation.

10. The system of claim 9 wherein the at least two parameters further comprise fueling quantity, injection timing, and injection system pressure.

11. The system of claim 8 wherein the controller is configured to iteratively vary the at least one of the combustion inputs and then adaptively adjust the control input to drive the operating point on the engine operating map to an extremum value.

12. The system of claim 11 wherein the controller is configured to iteratively vary the at least one of the combustion inputs subject to at least one predetermined bound on the combustion input.

13. The system of claim 8 wherein a simultaneous perturbation stochastic approximation is utilized to iteratively vary the at least one of the combustion inputs.

14. The system of claim 8 wherein the controller is further configured to evaluate a geographical position information and vary the weighted optimization of multiple variables including fuel consumption and reductant consumption based upon the geographical position information.

15. The system of claim 14 wherein the geographical position information is global positioning system (GPS) information.

16. The system of claim 14 wherein the controller is further configured to perform a multivariate optimization that accounts for actual or estimated fuel consumption, fuel cost as a function of geographical position, actual or estimated reductant consumption, reductant cost as a function of geographical position, and emissions requirements as a function of geographical position while meeting emissions criteria which vary as a function of geographical position.

17. The system of claim 8 wherein the SCR aftertreatment system comprises a reservoir of urea solution, and a doser configured to provide urea solution from the reservoir to an exhaust flow path at a position upstream of an SCR catalyst.

18. A method comprising:
operating a vehicle system including an internal combustion engine, an selective catalytic reduction aftertreatment system, and a controller configured to control operation of the engine by varying a plurality of charge constituents provided to one or more combustion chambers of the engine and configured to control operation of the selective catalytic reduction aftertreatment system;
iteratively perturbating at least one of two combustion inputs to the engine effective to vary an operating point on an engine operating map describing fuel consumption and NOx emissions of the system in response to the at least two combustion inputs to the engine independently from any a priori knowledge of initial values of the at least two combustion inputs;
determining fuel consumption and NOx emissions at each iterated operating point on the engine operating map, and
selecting each subsequent iterative operating point based upon an output of a perturbation function;
wherein the method is effective to seek an optimization of multiple variables including fuel consumption and reductant consumption, while meeting a predetermined NOx emissions criterion, and
wherein the determined fuel consumption and NOx emissions of a current operating point are utilized as inputs to the perturbation function to determine a subsequent operating point.

19. The method of claim 18 wherein the perturbation function comprises a steepest descent algorithm.

20. The method of claim 18 wherein the vehicle system includes a hybrid electric powertrain including a battery, power electronics, and a motor/generator.

21. The method of claim 20 wherein the optimization of multiple variables further includes a battery condition variable.

22. The method of claim 21 wherein the battery condition variable impacts service life of the battery.

23. The method of claim 18 wherein the optimization varies as a function of time and regulatory emissions requirements for a geographical location.

24. The method of claim 18 wherein the optimization varies as a function of time, fuel cost information for the geographical location, reductant cost information for the geographical location, and regulatory emissions requirements for the geographical location.

* * * * *